United States Patent
Wienke et al.

(10) Patent No.: US 9,879,757 B2
(45) Date of Patent: Jan. 30, 2018

(54) CHAIN COMPRISING POLYMERIC LINKS AND A SPACER

(71) Applicant: DSM IP ASSETS B.V., Heerlen (NL)

(72) Inventors: Dietrich Wienke, Echt (NL); Rigobert Bosman, Echt (NL); Roelof Marissen, Echt (NL); Jozef Siegfried Johannes Homminga, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 15/034,659

(22) PCT Filed: Dec. 9, 2014

(86) PCT No.: PCT/EP2014/077093
§ 371 (c)(1),
(2) Date: May 5, 2016

(87) PCT Pub. No.: WO2015/086627
PCT Pub. Date: Jun. 18, 2015

(65) Prior Publication Data
US 2016/0281820 A1    Sep. 29, 2016

(30) Foreign Application Priority Data

Dec. 10, 2013 (EP) ..................................... 13196497

(51) Int. Cl.
*F16G 13/12* (2006.01)
*B66C 1/12* (2006.01)
(Continued)

(52) U.S. Cl.
CPC .............. *F16G 13/12* (2013.01); *B66C 1/125* (2013.01); *D07B 5/00* (2013.01); *F16G 15/12* (2013.01)

(58) Field of Classification Search
CPC .......... F16G 13/12; F16G 13/14; F16G 15/12; D07B 5/00
(Continued)

(56) References Cited

U.S. PATENT DOCUMENTS 540,498 A  *  6/1895  Klatte ..................... F16G 13/14
                                                          59/84
3,153,898 A  *  10/1964  Gerhardt ................. F16G 13/14
                                                          156/160
(Continued)

FOREIGN PATENT DOCUMENTS

EP    0 205 960    12/1986
EP    0 213 208    3/1987
(Continued)

OTHER PUBLICATIONS

International Search Report for PCT/EP2014/077093, dated Oct. 6, 2015, 3 pages.
(Continued)

*Primary Examiner* — David B Jones
(74) *Attorney, Agent, or Firm* — Nixon & Vanderhye P.C.

(57) ABSTRACT

The present invention relates to a chain comprising a plurality of chain links comprising a polymeric fiber and wherein said chain comprises at least one spacer having a thickness Δ at the contact location through which loads are directly transmitted between said chain links and a ratio Δ/τ=f, with τ being the thickness of any of the chain links at the contact location through which loads are directly transmitted between said chain links and f being in a range between 0.10 and 2.50. The invention further relates to the use said chain for storing, securing, lashing and tying down for handling and transporting cargo, in lifting and hoisting, logging, hauling and rigging, propulsion and driving, mooring, cargo-hold of an aircraft or naval ship.

16 Claims, 2 Drawing Sheets

(51) Int. Cl.
*D07B 5/00* (2006.01)
*F16G 15/12* (2006.01)

(58) Field of Classification Search
USPC .............................................. 59/78, 83, 92
See application file for complete search history.

(56) References Cited

U.S. PATENT DOCUMENTS 3,707,021 A * 12/1972 Norrman ................ B66C 1/12
24/16 R
4,779,411 A * 10/1988 Kendall .................. F16G 13/12
112/417
8,468,793 B2 * 6/2013 Wienke ................... F16G 13/12
112/417

FOREIGN PATENT DOCUMENTS

| EP | 0 269 151 | 6/1988 |
|----|-----------|--------|
| EP | 0 200 547 | 7/1991 |
| EP | 0 504 954 | 9/1992 |
| EP | 0 472 114 | 4/1999 |
| FR | 1 185 563 | 8/1959 |
| GB | 916288 | 1/1963 |
| GB | 2 042 414 | 9/1980 |
| GB | 2 051 667 | 1/1981 |
| JP | 3-204423 | 9/1991 |
| LU | 39 593 | 3/1961 |
| WO | WO 01/73173 | 10/2001 |
| WO | WO 2005/066401 | 7/2005 |
| WO | WO 2008/089798 | 7/2008 |
| WO | 2009/115249 | 9/2009 |
| WO | WO 2009/056286 | 7/2010 |
| WO | 2013/186206 | 12/2013 |

OTHER PUBLICATIONS

Nakajima, "Advanced Fiber Spinning Technology", Woodhead Pulb. Ltd., 1994, ISBN 185573 182.7, 21 pages.

* cited by examiner

CHAIN COMPRISING POLYMERIC LINKS AND A SPACER

This application is the U.S. national phase of International Application No. PCT/EP2014/077093 filed 9 Dec. 2014, which designated the U.S. and claims priority to EP Patent Application No. 13196497.5 filed 10 Dec. 2013, the entire contents of each of which are hereby incorporated by reference.

FIELD

The present invention relates to a chain comprising a plurality of chain links comprising a polymeric fiber. The invention also relates to the use of said chain in certain applications.

BACKGROUND AND SUMMARY

Such a chain is known from prior art. For instance, document WO2008089798 discloses a chain comprising a plurality of interconnected links, wherein at least the links comprise polyolefin multifilament yarns, particularly ultra-high molecular weight polyethylene multifilament yarns. Document WO2009/115249A1 discloses a chain comprising a plurality of first links interconnected with a plurality of adjacent links, the first links comprising polymeric multifilament yarns and having a thickness $\tau_1$ at least at the portion where they interconnect with the adjacent links and the adjacent links have a thickness $\tau_2$ at least at the portion where they interconnect with the first links and wherein the ratio $\tau_2/\tau_1$ is at least 1.2. The examples in this document specifically disclose that the first chain links are made of UHMWPE yarns and the adjacent chain links are made of metal. Thus, the chain disclosed in WO2009/115249A1 is made of alternating rigid and flexible links made of different materials, thicknesses and weights and having approximately equal strength.

The above disclosures of known chains represent improvements in the state of the art, however there is a need to improve even further said chains. The efficiency of the chains disclosed in the prior art is lower because such chain constructions typically result in additional weight to the chain. In addition, because different materials, thicknesses and weights are employed for the construction of the chain links, such chains are produced at high costs and poses a danger risk to safety because the chain links show different aging (e.g. degradation and corrosion) behavior. The object of the invention is therefore to provide a chain comprising a plurality of chain links comprising a polymeric fiber having an improved efficiency, which reduces losses in strength while managing maximum load transfer.

The object of the invention is achieved with a chain comprising chain links comprising a polymeric fiber and wherein said chain comprises at least one spacer having a thickness $\Delta$ at the contact location through which loads are directly transmitted between said chain links and a ratio $\Delta/\tau=f$, with $\tau$ being the thickness of any of the chain links at the location through which loads are transmitted between said chain links and f being in a range between 0.10 and 2.50.

Surprisingly, it was found that the chain according to the present invention has a significant improved efficiency, namely it makes better use of the tensile strength as compared to the chains known in the prior art. In addition, significant less loss of utilized fiber strength results in a lower procurement price per strength unit of the chain.

It is true that document U.S. Pat. No. 4,779,411 also discloses a chain comprising a plurality of interconnected non-metallic chain links, particularly a chain comprising links having a core of polyester, nylon or Kevlar® multifilament yarns, fully encapsulated in a woven outer fabric of nylon or polyester. However, this document does not disclose any dimensions of the chain components. In contrast, document U.S. Pat. No. 4,779,411 teaches that only part of the yarns in the chain link contributes effectively to transmitting forces from one link to another and therefore the chain has reduced efficiency. In addition the service life of the chain disclosed in this document is limited, in particular under dynamic loading conditions. It is also true that documents, such as FR1185563A and U.S. Pat. No. 3,153,898A also disclose a chain comprising a sleeve. For instance, U.S. Pat. No. 3,153,898 discloses ring shaped members for use individually or as links in chains, which comprises a rings shaped hollow shell or jacket made of synthetic plastic material and enclosed therein a strand or sliver of glass filaments impregnated with a resin material. FR1185563 discloses a synthetic chain comprising a jacket made of glass fibers impregnated with a resin or a polymeric material. However, none of these documents disclose dimensions of the jacket disclosed therein nor a certain relation between the dimensions of said sleeves and of the chain links. Moreover, even if WO2009/115249A1 discloses chain links made of different materials and thicknesses, this document does not disclose a separate portion of a material (either connected or not to a chain link) at the contact location between two adjacent chain links. In addition, the (adjacent) links in the chain as disclosed in WO2009/115249A1 are merely tensile loaded components of the chain disclosed therein.

Additional advantages of the chain according to the present invention include lighter weight, lower production costs and no danger risk for safety. The chain according to the present invention is capable of transmitting forces under all kind of circumstances and environmental conditions, often for a prolonged period of time, without the chain being affected in any way, e.g. by breaking, fraying, damaging. Furthermore, in contrast to the rigid rings of steel made link chains, it is known that the opening of soft rings in textile link chains (i.e. chain links made of polymeric fibers) tend to collapse under load. However, some market regulations require easier removal of hooks even under tension of the chain. The spacer in the chain construction according to the present invention enables easy removal of hooks even when the chain is under load. Another advantage related to the higher efficiency of the chain according to the present invention are higher safety factors applicable that are typically requested by law for particular industries where chains are used. The significant higher link interface efficiency provides a significant stronger chain with chance of expanding the safety factor to the required legal level without significant increase of costs. Moreover, another advantage is that mechanical friction and wear will mainly occur in the spacer that does not carry tension load anyhow, thus mechanical friction and wear will undesirably influence the chain performance at a lower extend.

DETAILED DESCRIPTION

Figure 1:
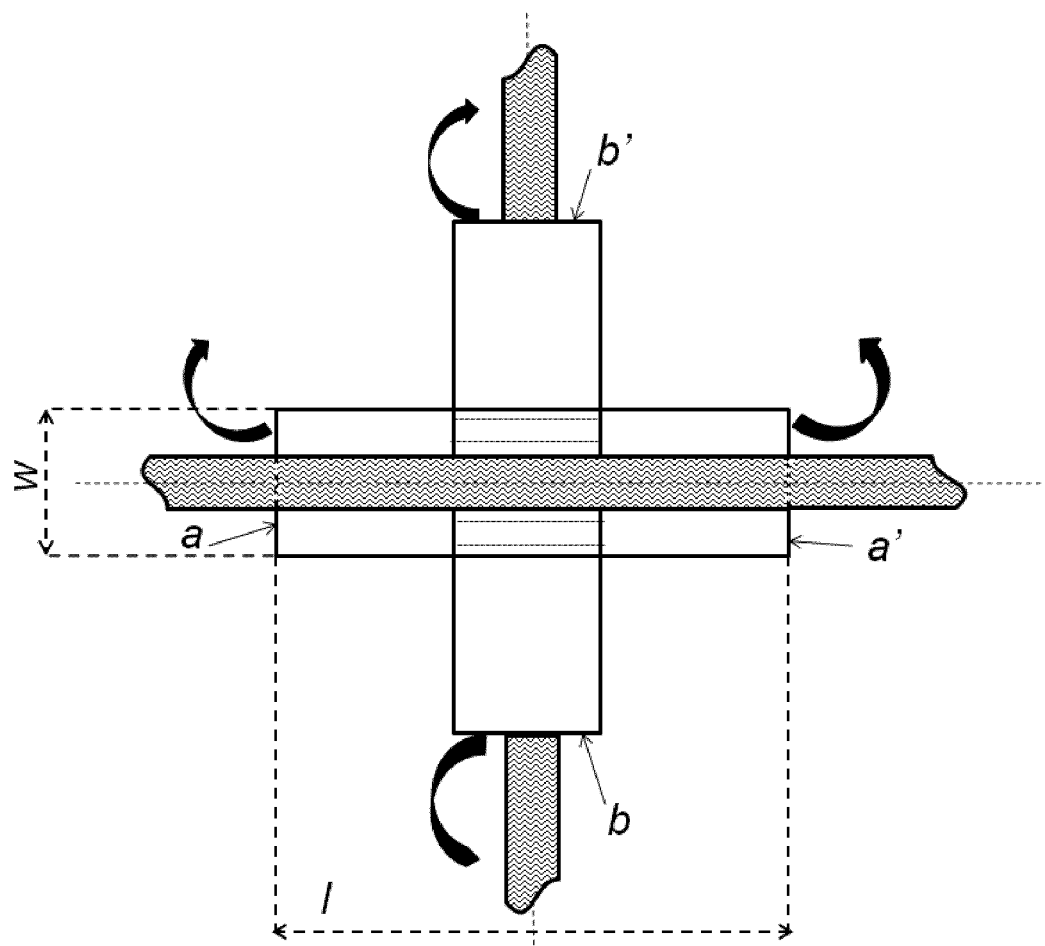
FIG. 1 is a schematic representation of polymeric links and a spacer in accordance with an embodiment of the invention.

By "spacer" is herein understood a portion of material that is discontinuous from the chain link (i.e. it does not form an integral part of the chain link, e.g. it is additional to the circumference of the link and it may be disconnected from the chain link or connected to said link, e.g. by ways as described herein below like sewing) having an effective thickness Δ between two adjacent chain links, at the contact location through which loads are directly transmitted between (two) adjacent chain links. The spacer of the present invention is essentially loaded on compression, being thus free of any tension loads. The spacer in the chain according to the present invention may also be regarded as a distance holder between (two) adjacent chain links.

By "effective thickness" is understood herein the square root of the cross sectional area of a spacer or of a chain link, respectively in the chain according to the present invention.

The chain according to the present invention comprises a plurality of chain links that are typically interconnected. By the portion where a chain link interconnects with another chain link or by the portion where (two) adjacent chain links interconnect is herein understood the portion from the circumference of the chain link in direct contact with the other chain link when the chain is under load.

By 'fiber' is herein understood an elongated body having a length, a width and a thickness, with the length dimension of said body being much greater than the transverse dimensions of width and thickness. The term fiber also includes various embodiments e.g. a filament, a ribbon, a strip, a band, a tape and the like having regular or irregular cross-sections. The fibers may have continuous lengths, known in the art as filaments, or discontinuous lengths, known in the art as staple fibers. The fibers may have various cross-sections, e.g. regular or irregular cross-sections with a circular, bean-shape, oval or rectangular shape and they can be twisted or non-twisted. A yarn for the purpose of the invention is an elongated body containing a plurality of fibers. The skilled person may distinguish between continuous filament yarns or filament yarns which contain many continuous filament fibers and staple yarns or spun yarns containing short fibers also called staple fibers.

The ratio f is any number between 0.10 and 2.50. Preferably, f is at least 0.15, more preferably at least 0.20, even more preferably at least 0.30 and most preferably at least 0.50 or at least 0.70 and even most preferably f is at least 0.90. Lower f values provide an insensitive threshold with negligible effect on interface efficiency, since the chain link may show sharp bending and thus may collapse at lower f values. Preferably, f is at most 2.30, more preferably at most 2.00, even more preferably at most 1.50 and most preferably f is at most 1.00. Higher f values provide a chain that is costly to manufacture. Moreover, higher f values will result in heavy chains due to excessive amounts of non-tensile load bearing interface materials.

The chain according to the present invention may comprise at least one chain link that is at least partially covered by a sleeve. The spacer (that also may be referred herein as 'interface') is thus a portion of the sleeve at the contact location where a chain link directly interconnects with an adjacent chain link and through which loads are transmitted between said chain links.

The sleeve and thus the spacer in the chain according to the present invention can comprise any type of material. Suitable examples of such materials include metals, preferably light metals and their alloys, e.g. lithium, magnesium and aluminum and Group 4 of the Periodical System of Elements (i.e. metals up to nickel); polymers, such as thermosetting polymers and polymer compositions and/or thermoplastic polymers and polymer compositions; textiles; wood and/or any type of fibers. Preferably, the spacer comprises fiber materials or textile materials. Also preferably, the spacer comprises polymeric fibers, i.e. fibers comprising a polymer or metallic fibers, i.e. fibers comprising a metal. More preferably, the spacer consists of fibers selected from the group consisting of polymeric fibers and metallic fibers. The polymer in the polymeric fiber may be any polymer and/or polymer composition that can be processed into fibers. Said polymeric fibers preferably include high performance polymeric fibers. In the context of the present invention, high performance polymeric fibers are understood to include those fibers preferably comprising semicrystalline polymers e.g. polyolefins, such as homopolymers and/or copolymers of alpha-olefins, e.g. ethylene and/or propylene; polyoxymethylene; poly(vinylidine fluoride); poly(methylpentene); poly(ethylene-chlorotrifluoroethylene); polyamides and polyaramides, e.g. poly(p-phenylene terephthalamide) (known as Kevlar®); polyarylates; poly(tetrafluoroethylene) (PTFE); poly{2,6-diimidazo-[4,5b-4', 5'e]pyridinylene-1,4(2,5-dihydroxy)phenylene} (known as M5); poly(p-phenylene-2, 6-benzobisoxazole) (PBO) (known as Zylon®); poly(hexamethyleneadipamide) (known as nylon 6,6); polybutene; polyesters, e.g. poly(ethylene terephthalate), poly(butylene terephthalate), and poly(1,4 cyclohexylidene dimethylene terephthalate); polyacrylonitriles; polyvinyl alcohols and thermotropic liquid crystal polymers (LCP) as known from e.g. U.S. Pat. No. 4,384,016, e.g. Vectran® (copolymers of para hydroxybenzoic acid and para hydroxynaphtalic acid). Also combinations of fibers manufactured from such polymeric materials can be used for manufacturing the sleeve and thus the spacer of the chain according to the present invention.

Preferably, the sleeve and thus the spacer comprises a polyolefin fiber. More preferably, the polyolefin fibre comprise alpha-polyolefins, such as propylene and/or ethylene homopolymers and/or propylene and/or ethylene based copolymers. Even more preferably, the polyolefin is a polyethylene, most preferably ultrahigh molecular weight polyethylene (UHMWPE). By UHMWPE is herein understood a polyethylene having an intrinsic viscosity (IV) of at least 4 dl/g, more preferably at least 8 dl/g, most preferably at least 12 dl/g. Preferably said IV is at most 40 dl/g, more preferably at most 30 dl/g, more preferably at most 25 dl/g. The IV may be determined according to ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration. Preferably, the UHMWPE fibers are gel-spun fibers, i.e. fibers manufactured with a gel-spinning process. Examples of gel spinning processes for the manufacturing of UHMWPE fibers are described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fibre Spinning Technology*", Ed. T. Nakajima, Woodhead Publ. Ltd (1994), ISBN 185573 182 7. The sleeve and thus the spacer of the chain according to the present invention may further contain any customary additives, in an amount of for instance between 0 and 30 wt %, preferably between 5 and 20 wt % from the total spacer composition. The sleeve and thus the spacer may be coated or contain flame retardants, coatings to reduce adhesion, colorants, delusterants, anti-oxidants, thermal stabilizers, flow promoters and the like.

The sleeve and thus the spacer of the chain according to the present invention can comprise a rigid, semi-rigid or a flexible material. Preferably, the sleeve comprises a semi-rigid or a flexible material because such spacers fit better the chain link for optimum load transfer under different and/or asymmetric load conditions. Rigidity can be measured according to ASTM D790 (bending test) and ASTM D638 (tensile tests), or similar tests. Typically, a rigid material may have a bending strength of higher than 0.5 times the tensile strength and an apparent flexural fracture strain smaller than 20%. Typically, a semi-rigid material may be a material having a flexural strength between 0.1 times and 0.5 times the tensile strength; typically, accompanied by a no-break appearance at the end of the tests. A flexible material generally may have a no appreciable flexural strength, so below 0.1 times the tensile strength, and typically has a no-break in a bending test.

The sleeve and thus the spacer in the chain according to the present invention can have any shape known in the art. For instance, the sleeve or the spacer can have any cross-sectional shape such as circular, rectangular and ellipsoidal. However, the shape of the spacer should be such that direct load bearing contact between chain links is prevented. Load bearing contact between chain links should be mainly achieved via the spacers. The spacer may be an open structure, e.g. when the spacer is a portion of a sleeve covering a chain link; or a closed structure, e.g. a multilayered webbing (e.g. a strip) located on the inside of a chain link, at the contact location where the adjacent chain links directly interconnect.

Figure 2:
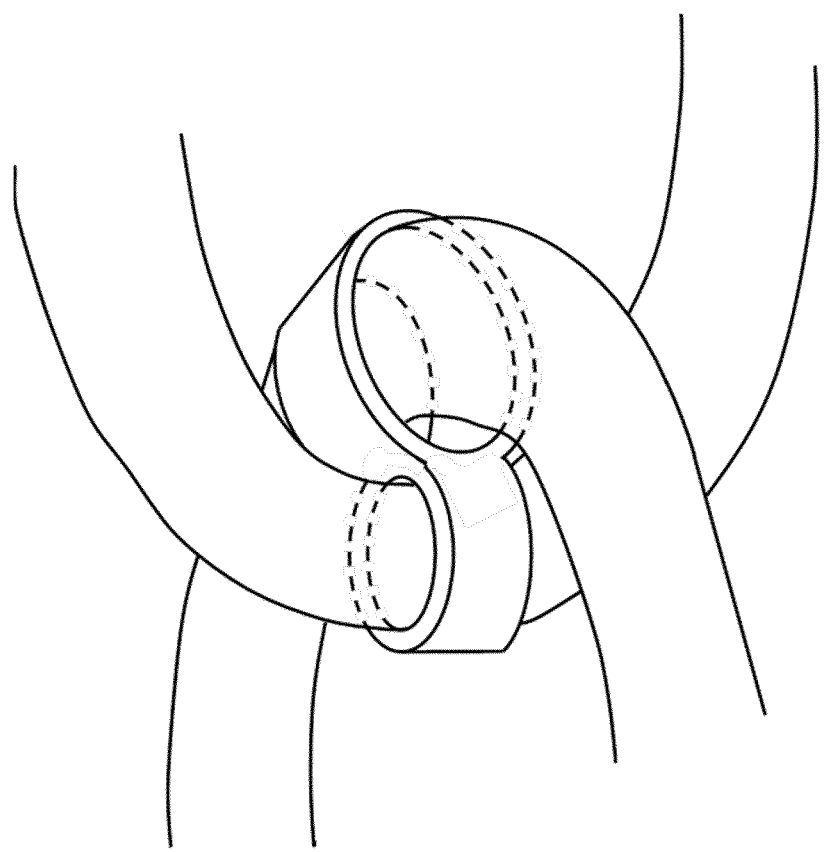
FIG. 2 is a schematic perspective view of the links and spacer as depicted in FIG. 1.

The sleeve and thus the spacer may have a layered structure, wherein a plurality of layers containing a woven fabric are stacked and preferably attached to each other, e.g. by sewing to form for instance a strip (e.g. webbing) of material. The number of layers in said structure is at least 1, preferably at least 2, more preferably at least 5, yet more preferably at least 8 or at least 10. The sleeve, i.e. strips may be attached inside the loop of a chain link, on top of the circumference of the chain link, at the contact location where each adjacent chain links directly interconnect, by connecting the ends of the connected (e.g. stitched) ends. A sleeve can be also made by overlapping (crossing) two strips in preferably a right angle and then connecting the two crossed strips in any way, e.g. by stitching (forming an interface, herein referred to also as "crossed interface"). The ends of the crossed strips (a and a' in FIG. 1) can also be connected over the whole width of the strips, in any way, e.g. by sewing. The length of the strip should be sufficiently large to provide stable connection of strip ends (b and b' in FIG. 1), in order to prevent that the strip is squeezed out between the links. The patterned areas in FIG. 1 represent two chain links directly interconnected. The skilled person would thus know how to determine the dimensions of the strip. FIG. 1 schematically illustrates such a 2D "crossed interface", wherein w is the width of a strip, l is the length of a strip. FIG. 2 is a schematic 3D representation of FIG. 1, i.e. the crossed interface between two chain links, wherein a is connected to a' and b is connected to b', forming two loops. Though these two loops may appear in FIG. 2 of unequal in size, they preferably have about the same size and diameter.

For safety and cost reasons it is preferred that all spacers and/or sleeves in the chain according to the present invention have the same shape, dimensions and are made of the same material, while maintaining approximately the same local strength along the chain.

The sleeve and thus spacer in the chain of the present invention can be produced in any way known in the art such as filament winding, warping, braiding, weaving or other standard and less standard textile manufacturing techniques. It may additionally include coating, extrusion or calendaring to add extra layers.

The sleeve can partially or fully cover the surface of at least one chain link. However, the sleeve should cover a sufficient portion of a chain link to reduce direct load bearing contact between the links. In practice this means that the sleeve may cover at least 5% of the surface of at least one chain. Preferably, the sleeve may cover at least 10%, preferably at least 20%, more preferably 30% and most preferably at least 40% or 50% and preferably at most 99%, more preferably at most 80%, even more preferably at most 70% and most preferably at most 60% of the total surface of a chain link, this including the contact location through which loads are directly transmitted between two adjacent chain links.

Preferably, the sleeve has a tubular shape or the shape of a strip. Preferably, each of the chain links comprises a sleeve. Preferably, each chain link is at least partially covered by a sleeve and said chain links comprising the sleeves may overlap and cross each other at various angles between them at the location through which loads are transmitted between said chain links and may form for instance a crossed tubular 3D structure. The ends of said sleeve may not be necessary connected to each other or to the chain link or they may be connected to each other or to the chain link, e.g. by sewing.

The sleeve can be applied on the chain link in any way known in the art, for example in the same way as described in U.S. Pat. No. 4,210,089 and U.S. Pat. No. 4,850,629 for roundslings. These patent publications disclose roundslings comprising a load-bearing core in the form of parallel turns (also called loops) of load bearing strand material contained within tubular cover means. These roundslings are constructed by forming an endless loop of strands of load-bearing material to form a load-bearing core, e.g. by placing a plurality of turns of said strands in parallel relationship on a surface having guide means mounted on said surface, fastening said turns at their terminal ends to holding means, pulling a tubular cover means having two ends over one of said guide means to envelop said turns, fastening the terminal ends of said parallel load-bearing turns and fastening the terminal ends of said cover means to form an endless loop. In the prior art, the terminal ends of the load-bearing strand material would ordinarily be fastened to another end of a strand of the same material, thus forming an end connection and the entire inner core of load-bearing material would be hidden inside the cover material. Typically, fastening of ends is done by making an end-to-end connection, or by connecting an end to an adjacent turn, e.g. by knotting or with adhesive tape. In case of chain links that contain a fabric webbing as core, the connection can also be made by stitching; as in for example U.S. Pat. No. 4,022,507 described for roundslings.

Preferably, the chain according to the invention may comprise contact locations through which loads are directly transmitted between the chain links, which may comprise a spacer or may be without a spacer. More preferably, the chain according to the invention may comprise contact locations between adjacent chain links through which loads are directly transmitted between the chain links comprising a spacer and contact locations between adjacent chain links through which loads are directly transmitted between the chain links that are without a spacer, in an alternating manner, such that each interconnection location between adjacent chain links may be provided with a spacer belonging to one of the two links. Most preferably, each contact location of two adjacent links through which loads are directly transmitted between the chain links comprises a spacer.

The chain according to the invention can comprise links having the same or different inner length, inner width size and thickness. Preferably, all chain links in the chain according to the invention have the same thickness τ. The chain according to the invention can have any length. For practical reasons, the chain can have lengths from 0.25 m to 12000 m, preferably at least 1 m; at least 3 m; at least 6 m; at least 10 m; at least 100 m or at least 500 m or at least 1000 m in length. The length of the chain is typically determined by the inner length of its loops times the number of loops linked together. The chain link inner length L can range from about 25 mm to 10 m, preferably 80 mm, preferably 100 mm, preferably 250 mm.

The chain according to the present invention may also comprise means to attach it to another structure such as a flat bottom on truck, ship, aircraft or train wagon or on a pallet for instance. In this case, pallet attachment fittings, such as double studs, may be connected to the chain. Fittings, and hooks, are generally made from metal, although engineering plastics could alternatively be used. In a preferred embodiment, fittings and hooks are made of light weight metal, preferably magnesium or high strength composite materials, such as carbon fiber epoxy composites. Such light-weight yet strong fittings further contribute to weight reduction of the chain.

The fixation means can be adhesives, preferably liquid adhesives that can be cured after application; stitches and/or splicing. Preferably, the fixation means are stitches, because they can be easily applied in a well-controlled manner, at the desired location. Preferably, stitching is done with a yarn containing high-strength fibers. The liquid adhesive is preferably injected into the connection means, such as an applied knot, and then cured to fixate the connection means. Connections can also be made by locally applying heat whereby the multifilament yarns at least partly melt and fuse together. Preferably the end of the chain may be attached to a hook for shortening, which can be from casted iron, steel or lighter metals including titanium, aluminium or magnesium. In a preferred similar set-up, one side of the chain will be attached to a tensioner to impose permanent load on the synthetic chain for optimum fixation of cargo respectively freight.

Preferably, the polymeric fiber in the chain links in the chain according to the present invention is a polymeric multifilament yarn. The polymeric multifilament yarns, hereafter also referred to for simplicity as yarns may be produced according to any technique known in the art, preferably by melt, solution or gel spinning. Such chains are already disclosed for instance in WO20080899798 and WO2009115249, incorporated herein by reference.

The polymers used to produce said polymeric fiber in the chain links of the chain according to the present invention may be any polymer and/or polymer composition that can be processed into said fiber. The polymeric fiber in said chain preferably includes high performance polymeric fibers. In the context of the present invention, high performance polymeric fibers are understood to include those preferably comprising semicrystalline polymers e.g. polyolefins, such as homopolymers and/or copolymers of alpha-olefins, e.g. ethylene and/or propylene; polyoxymethylene; poly(vinylidine fluoride); poly(methylpentene); poly(ethylene-chlorotrifluoroethylene); polyamides and polyaramides, e.g. poly (p-phenylene terephthalamide) (known as Kevlar®); polyarylates; poly(tetrafluoroethylene) (PTFE); poly{2,6-diimidazo-[4,5b-4',5'e]pyridinylene-1,4(2,5-dihydroxy)phenylene} (known as M5); poly(p-phenylene-2, 6-benzobisoxazole) (PBO) (known as Zylon®); poly (hexamethyleneadipamide) (known as nylon 6,6); polybutene; polyesters, e.g. poly(ethylene terephthalate), poly(butylene terephthalate), and poly(1,4 cyclohexylidene dimethylene terephthalate); polyacrylonitriles; polyvinyl alcohols and thermotropic liquid crystal polymers (LCP) as known from e.g. U.S. Pat. No. 4,384,016, e.g. Vectran® (copolymers of para hydroxybenzoic acid and para hydroxynaphtalic acid). Also combinations of fibers manufactured from such polymeric materials can be used for manufacturing the chain links in the chain according to the present invention. Preferably, the chain links comprises high performance fibers, such as UHMWPE fibers. Preferably, the chain links according to the present invention comprises polyolefin fibers. More preferably, the polyolefin fibres comprise alpha-polyolefins, such as propylene and/or ethylene homopolymers and/or propylene and/or ethylene based copolymers. Even more preferably, the polyolefin is a polyethylene, most preferably an ultrahigh molecular weight polyethylene (UHMWPE). By UHMWPE is herein understood a polyethylene having an intrinsic viscosity (IV) of at least 4 dl/g, more preferably at least 8 dl/g, most preferably at least 12 dl/g. Preferably said IV is at most 50 dl/g, more preferably at most 35 dl/g, more preferably at most 25 dl/g. Intrinsic viscosity is a measure for molecular weight (also called molar mass) that can more easily be determined than actual molecular weight parameters like $M_n$ and $M_w$. The IV may be determined according to ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration. When the intrinsic viscosity is too small, the strength necessary for using various molded articles from the ultrahigh molecular weight polyethylene sometimes cannot be obtained, and when it is too large, the processability, etc. upon molding is sometimes worsen.

Preferably, the UHMWPE fibers are gel-spun fibers, i.e. fibers manufactured with a gel-spinning process. Examples of gel spinning processes for the manufacturing of UHMWPE fibers are described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1 and EP 1,699,954.

The average molecular weight ($M_w$) and/or the intrinsic viscosity (IV) of said polymeric materials can be easily selected by the skilled person in order to obtain a fiber having desired mechanical properties, e.g. tensile strength. The technical literature provides further guidance not only to which values for $M_w$ or IV a skilled person should use in order to obtain strong fibers, i.e. fibers with a high tensile strength, but also to how to produce such fibers. Preferably, the polymeric fibers used in the chain according to the present invention have a tensile strength of at least 1.2 GPa, more preferably at least 2 GPa, preferably at least 3 GPa, yet even more preferably at least 3.5 GPa, yet even more preferably at least 4 GPa, most preferably at least 5 GPa, and a tensile modulus of at least 40 GPa, more preferably at least 60 GPa, most preferably at least 80 GPa. The chain links in the chain according to the present invention preferably comprises a UHMWPE yarn with a strength of 35 cN/dtex may achieve a final residual strength of at least 6.5 cN/dtex, more preferably at least 8 cN/dtex, even more preferably at least 10 cN/dtex, most preferably at least 12 cN/dtex. The efficiency of the chain according to the present invention is preferably at least 15%, more preferably at least 20% and most preferably at least 30%.

Preferably, the breaking strength of the links of the chain of the invention is at least 1 kN, more preferably at least 10 kN, more preferably at least 100 kN, more preferably at least 1000 kN. Higher breaking strength of a chain link can be achieved, for example by using thicker spacer and/or more multifilament yarns when manufacturing said links or by using stronger (having higher tenacity) UHMWPE fiber grades.

Preferably, the chain links have a total weight per unit length of at least 1 g/m. The weight per unit length can be increased by using higher titer and/or more multifilament yarns.

In a chain, forces are typically transmitted from one chain link to another through the interconnections, where links make direct local mutual contact. At the contact points or locations the chain links are generally highly stressed (mainly compressive), which easily leads to local damage or even fracture of the link. When using polyolefin fibers and especially UHMWPE fibers in the chain links, the service life and reliability of the chain is improved, in particular under dynamic loading conditions.

The titer of said fibers is preferably at least 100 denier, even more preferably at least 1000 denier, yet even more preferably at least 2000 denier, yet even more preferably at least 3000 denier, yet even more preferably at least 5000 denier, yet even more preferably at least 7000 denier, most preferably at least 10000 denier. The chain according to the present invention comprises a polymer fiber that may be in the form of loops containing multiple windings of fibers (e.g. yarns) upon themselves or of loops made from a rope or a strap comprising the fibers (e.g. yarns). The chain links in the chain according to the present invention particularly comprise laid, twisted, braided or woven polymeric fiber. The multifilament yarns or fibers may have any construction known in the art, and/or may be combined in any textile construction known in the art. It is possible for instance to make the links of the chain in the form of endless loops of fiber bundles or yarns, extending more or less parallel to each other. A particularly preferred chain has links that comprise at least partly fused polyolefin multifilament yarns. Links that comprise at least partly fused polyolefin multifilament yarns may be present in the chain in the form of e.g. rings, loops, roundslings and preferably also comprise a cover for protection and/or load distribution. Chain links that comprise at least partly fused polyolefin multifilament fibers (e.g. yarns) may be manufactured by winding a multifilament fiber or yarn of the polyolefin around a pair of wheels to form a loop, heating the multifilament yarn to a temperature below the melting point of the multifilament yarn at which temperature the filaments at least partly fuse and stretching the loop by increasing the distance between the wheels, while simultaneously rotating the wheels. By increasing the inter-wheel distance, the filaments are drawn. Chains comprising such links are strong and moreover distribute the loads between links particularly well. Preferably, the chain links comprising polymeric fibers are loops obtained by winding and fusing UHMWPE fibers. Such loops may be manufactured by winding an UHMWPE fiber, e.g. yarn around a pair of wheels to form said loops, heating the fiber, e.g. yarn to a temperature below the melting point of the UHMWPE at which temperature the filaments comprising said fiber, e.g. yarn at least partly fuse, and stretching the loop by increasing the distance between the wheels, while simultaneously rotating the wheels. Another way may be winding of loops around a mould and subject them to a pressure at an elevated temperature yet being below the melting point. Typical temperatures are between 130° C. and 148° C. and typical pressures above 50 bar. Higher pressures and temperatures provide more sturdy chain links. Temperatures approaching the melting temperature of the polymeric fiber too closely cause increasingly loss of molecular orientation, thus increasing strength loss, up to almost complete strength loss upon actual melting.

The chain links of the chain of the present invention may comprise a strip of material forming a plurality of convolutions of said strip, the strip having a longitudinal axis and each convolution of said strip comprising a twist along the longitudinal axis of said strip, said twist being an odd multiple of 180 degrees. Such a chain link is described in the published patent application WO2013186206, incorporated herein by reference. By a convolution of the strip is herein understood a loop thereof, also called a winding or a coiling, i.e. a length of said strip starting at an arbitrary plane perpendicular to the longitudinal axis of the strip and ending in an endless fashion at the same plane, thereby defining a loop of said strip. By strip is herein meant a flexible elongated body having a thickness (t) and a width (w), wherein thickness (t) is much smaller than width (w). Preferably the strip has a width to thickness ratio of at least 5:1, more preferably at least 10:1, the width to thickness ratio preferably being at most 200:1, and even more preferably at most 50:1. Sometimes a strip may as well be called a band or a flat band. Examples of a strip may be a tape, a film or a strap. A strap is readily made for example by weaving, plaiting or knitting yarns into any construction known in the art, e.g. a plain and/or twill weave construction for instance. The strap preferably has an n-ply textile webbing construction where n is preferably at most 4, more preferably 3 and most preferably 2. Such webbing construction has the advantage that it provides the chain link with increased flexibility. The term "plurality of convolutions" may also be understood herein as "coiled into a plurality of overlapping layers". Said overlapping layers of the strip are preferably substantially superimposed upon one another but may also present a lateral offset. The convolutions may be in direct contact to each other but may also be separated. Separation between the convolutions may for example be by a further strip of material, an adhesive layer or a coating. Preferably, the chain link in the chain according to the present invention comprises at least 2 convolutions of the strip of material, preferably at least 3, more preferably at least 4, most preferably at least 8 convolutions. The maximum number of convolutions is not specifically limited. For practical reasons 1000 convolutions may be considered as an upper limit.

The thickness and width of the strip are not particularly limited. It will be obvious to the skilled person that thickness, width of the strip and the number of convolutions of said strip may influence the width and thickness of chain link. Thickness of the strip will depend upon the nature of the strip and its material. A typically range of thickness may be between 10 micron and 10 mm, more preferably between 20 micron and 5 mm. The width of the strip of material will depend upon the desired dimensions of chain link. The length of the convolutions of the convoluted strip of material may vary broadly. Such length may depend on the trajectory described by the strip of material and the tightness towards the adjacent convolutions of the strip of material. Preferably, the difference in length between two adjacent convolutions of the strip of material is less than 6 times the thickness of the strip, preferably less than 4 times the thickness of the strip, most preferably less than 2 times the thickness of the strip. Preferably, the length of each convolution differs from the average length of all convolutions by less than 6 times, preferably less than 4 times, and most preferably less than 2 times the thickness of the strip. By average length of all convolutions is understood the sum of all individual length of the convolutions divided by the number of convolutions of the strip. Each convolution of the strip of material may tightly superimpose adjacent convolutions of the strip of material, forming a chain link with increased density. Preferably, the density of the chain is between 70% and 90% of the maximum obtainable density. An increase in said density can be achieved by adjusting the various lengths of the convolutions contained by the chain link. The maximum obtainable density is herein understood the density of the strip used to produce the chain link.

Each convolution of the strip of material may comprise a twist of an odd multiple of 180 degrees along its longitudinal axis; preferably the odd multiple is one. Said twist of an odd multiple of 180 degrees will result in a chain link comprising a twist of an odd multiple of 180 degrees along its longitudinal axis. The presence of said twist in each convolution of the strip of material results in a chain link with a single outer surface. Another characteristic of said construction is that the lateral surfaces of a first end of the strip of material are superimposed on either side by the convoluted strip of material. It was observed that said twist results in a construction such that the convolutions lock themselves against relative shifting. Preferably, at least 2 convolutions of the strip of material are connected to each other by at least one fastening means. Although the construction inherently prevents dislocation of the individual convolutions of the strip of material, it was observed that use of fastening means further improves the stability of the chain link. Examples of fastening means in the context of the present invention are stitching, glue, knotting, bolt, heat sealing, rivets or the like. Preferably, the ends of the strip of material are connected by at least one fastening mean. Such a construction may for example be achieved by adjustment of the lengths of the strip of material such that the two ends of the strip overlap and applying a stitching through the chain link at said overlapping position or the one end of the strip reaches the other end through an opening across the convolutions of the chain link. It was observed that such a construction can easily be achieved with a strip of material providing gaps, as may be introduced for example in the form of perforations, eyes, slits or splices, occurring at equidistant intervals along the longitudinal axis of the strip. Such a strip of material in its convoluted form may result in overlapping of said gaps throughout the convoluted strip of material, providing a chain link with one or more openings suitable for applying fastening means.

In one embodiment the strip of material is a tape. The tapes may be prepared in a number of ways. A preferred method for the production of the tapes comprises feeding a polymeric powder between a combination of endless belts, compression-moulding the polymeric powder at a temperature below the melting point thereof and rolling the resultant compression-moulded polymer followed by drawing. Such a method is for instance described in U.S. Pat. No. 5,091,133, which is incorporated herein by reference. If desired, prior to feeding and compression-moulding the polymer powder, the polymer powder may be mixed with a suitable liquid organic compound having a boiling point higher than the melting point of said polymer. Compression moulding may also be carried out by temporarily retaining the polymer powder between the endless belts while conveying them. This may for instance be done by providing pressing platens and/or rollers in connection with the endless belts. Another method for the production of the tapes comprises feeding a polymer to an extruder, extruding a tape at a temperature above the melting point thereof and drawing the extruded polymer tape below its melting temperature. If desired, prior to feeding the polymer to the extruder, the polymer may be mixed with a suitable liquid organic compound, for instance to form a gel, such as is preferably the case when using ultra high molecular weight polyethylene. Yet another method to prepare the tapes is by a gel process. A suitable gel spinning process is described in for example GB-A-2042414, GB-A-2051667, EP 0205960 A and WO 01/73173 A1, and in "Advanced Fibre Spinning Technology", Ed. T. Nakajima, Woodhead Publ. Ltd (1994), ISBN 185573 182 7. In short, the gel spinning process comprises preparing a solution of a polymer of high intrinsic viscosity, extruding the solution into a tape at a temperature above the dissolving temperature, cooling down the film below the gelling temperature, thereby at least partly gelling the tape, and drawing the tape before, during and/or after at least partial removal of the solvent.

In the described methods to prepare tapes, the drawing, preferably uniaxial drawing, of the produced tape may be carried out by means known in the art. Such means comprise extrusion stretching and tensile stretching on suitable drawing units. To attain increased mechanical strength and stiffness, drawing may be carried out in multiple steps. In case of the preferred ultrahigh molecular weight polyethylene tapes, drawing is typically carried out uniaxially in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached. This results in high strength tapes, whereby for tapes of ultrahigh molecular weight polyethylene, strengths of 1.5 GPa to 1.8 GPa and more may be obtained.

Yet another method for the preparation of the tapes comprises mechanical fusing of unidirectional oriented fibers under a combination of pressure, temperature and time. Such a tape and a method to prepare such a tape are described in EP2205928, which is incorporated herein by reference. Preferably the unidirectional oriented fibers comprise ultrahigh molecular weight polyethylene (UHMWPE). UHMWPE fibres consisting of polyethylene filaments that have been prepared by a gel spinning process, such as described, for example, in GB 2042414 A or WO 01/73173 A1, are preferably used. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during and/or after the removal of the solvent. A UHMWPE tape prepared by mechanical fusing of fibers yields particularly good strength to weight performance of the chain link.

Preferably, the strip of material is a fabric or a strap made from yarns. The fabric or the strap is readily made for example by weaving or knitting yarns into any construction known in the art, e.g. a plain and/or twill weave construction for instance. Preferably, the strap is a narrow weave. The strap preferably has an n-ply webbing construction where n is preferably at most 4, more preferably at most 3 and most preferably 2.

The chain link comprising a strip in the chain according to the invention can be made by a method comprising the steps of (a) providing a strip of material, (b) twisting a first length of the strip by an odd multiple of 180 degrees about its longitudinal axis, (c) forming a closed loop with said twisted first length by joining said length with the further strip, and (d) superimposing further strip to the closed loop to provide a plurality of twisted convolutions of said strip. Preferably, the closed loop is formed around a pair of rotating wheels and the convolution of the strip of material is performed while the formed loop is cycling around the pair of wheels. Preferably the pair of wheels are arrange orthogonal to one another. Preferably, the chain link is processed by winding and fusing the strip of material. Such a chain link may be manufactured by winding a strip of material for example around a pair of wheels to form a chain link, heating the strip of material to a temperature below the melting point of the strip of material at which temperature the strip of material at least partly fuses, and stretching the chain link by for example increasing the distance between the wheels, while simultaneously rotating the wheels. By increasing the inter-wheel distance, the strip of material is drawn. A chain link can comprise adjacent convolutions that are at least partly fused to one another, such chain link having optimized strength.

Preferably, the chain links in the chain according to the present invention are of substantially the same length and thickness as the efficiency of the chain could yet be further improved.

The polymeric fiber in the chain links of the chain according to the present invention may further contain any customary additives, in an amount of for instance between 0 and 30 wt %, preferably between 5 and 20 wt % from the total polymeric fiber composition. The polymeric fibers may be coated, coatings to reduce adhesion, colorants, delusterants, anti-oxidants, thermal stabilizers, flow promoters and the like. For instance, the polymer fibers in said chain are coated with 10 to 20 wt % polyurethane to hold the fibers together in the yarn.

At least part of the chain links of the chain according to the present invention may comprise polyolefin fibers and the other part may comprise a polymeric fiber with the polymer not being a polyolefin. Such a chain may have different properties along the length of the chain. For instance, some parts of the chain may have mechanical properties favorable to withstanding dynamic loading conditions, while other parts may have mechanical properties favorable to withstanding static loading conditions. Another possibility is that parts of the chain may be made lighter than water (these parts will generally comprise a polyolefin multifilament yarn) while other parts may be made heavier than water. It is also possible that some links comprise said polymeric other than polyolefin fibers in combination with polyolefin fibers, for example in the form of hybrid fibers. At least part of the chain links may further comprise glass fibers, carbon fibers, metal fibers, aromatic polyamide fibers, poly(p-phenylene-2, 6-benzobisoxazole) (PBO) fibers, M5 fibers, and/or poly(tetrafluoroethylene) (PTFE) fibers. More preferred, at least part of the links comprise at least 51 vol. % of UHMWPE fibers, even more preferred at least 75 vol. %, even more preferred at least 90 vol. %, and most preferred at least 95 vol. %. A particularly preferred chain is characterized in that all chain links comprise polyolefin fibers, more preferably UHMWPE fibers.

When installed, the chains of the invention are useful and reliable in providing secure anchorage of heavy cargo in extreme conditions, as for example a heavy military aircraft on the pitching deck of a carrier on heavy seas or in cargo aircraft in turbulent air.

The invention also relates to a method to enhance the mechanical properties, in particular the strength of a chain according to the invention. It was found that the mechanical properties of the chain according to the invention, in particular its strength can be improved by pre-stretching the chain prior to its use below the melting point of the polyolefin, more preferably between 80-120° C., and most preferably between 90-110° C.

In a preferred embodiment of the method, the chain according to the invention is pre-stretched at a temperature below the melting temperature $T_m$ of the polyolefin, by applying a static load of at least 20%, more preferably at least 40%, and most preferably at least 60% of the breaking load of the chain for a period of time long enough to achieve a permanent deformation of the chain of between 2 and 20%, and more preferably between 5 en 10%. By permanent deformation is herein understood the extent of the deformation from which the chain cannot anymore recover.

In a second preferred embodiment of the method, the chain according to the invention is subjected to a number of load cycles. Preferably, the number of cycles ranges from 2-25, more preferably from 5-15, and most preferably from 8-12, whereby the maximum load applied is lower than 45% of the breaking load of the chain, more preferably lower than 35% of the breaking load of the chain, and most preferably lower than 25% of the breaking load of the chain. It is possible according to the invention to unload the chain during load cycling. In a preferred method however, the minimum load applied is at least 1%.

In a fourth preferred embodiment, the chain is pre-stretched as explained hereinabove at room temperature.

The present invention also relates to use of the chain according to the present invention for storing, securing, such as securing a roll on/off dumpster to a dumpster hauling truck or freight to commercial trucks, flat bed trailers, lashing and tie down for handling and transporting cargo, in lifting and hoisting, logging, hauling and rigging, propulsion and driving, mooring, cargo-hold of an aircraft or naval ship and the like.

Moreover, the present invention also relates to a use of a spacer for increasing efficiency of a load-bearing component, such as a chain, wherein said spacer has a thickness $\Delta$ at the contact location through which loads are directly transmitted between said chain links and a ratio $\Delta/\tau=f$, with $\tau$ being the thickness of any of the chain links at the contact location through which loads are directly transmitted between said chain links and f being in a range between 0.10 and 2.50. Said spacer is further described herein.

The present invention also directs to a process for increasing the efficiency of a load-bearing component, such as a chain, by applying a spacer having a thickness $\Delta$ at the contact location through which loads are directly transmitted between said chain links and a ratio $\Delta/\tau=f$, with $\tau$ being the thickness of any of the chain links at the location through which loads are directly transmitted between said chain links and f being in a range between 0.10 and 2.50. Said spacer is further described herein.

It is noted that the invention relates to all possible combinations of features recited in the claims. Features described in the description may further be combined.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will be further elucidated with the following examples without being limited hereto.

EXAMPLES

Materials and Methods

Intrinsic Viscosity (IV) is determined according to ASTM-D1601/2004 at 135° C. in decalin, the dissolution time being 16 hours, with DBPC as anti-oxidant in an amount of 2 g/l solution, by extrapolating the viscosity as measured at different concentrations to zero concentration. There are several empirical relations between IV and Mw, but such relation is highly dependent on molar mass distribution. Based on the equation $M_w=5.37*10^4 [IV]^{1.37}$ (see EP 0504954 A1) an IV of 4.5 dl/g would be equivalent to a $M_w$ of about 422 kg/mol.

Titre of a yarn is determined by weighing 10 meters of the yarn and transforming the obtained value in denier (grams per 9000 meters).

Side chains in UHMWPE sample is determined by FTIR on a 2 mm thick compression molded film by quantifying the absorption at 1375 $cm^{-1}$ using a calibration curve based on NMR measurements (as in e.g. EP 0 269 151).

Tenacity (cN/dtex) of a chain is determined by dividing the breaking strength of the chain by the weight of a unit length of the chain.

Efficiency (%) of a chain is the tenacity of the chain divided by the tenacity of the ingredient fibers (i.e. the tenacity of the ingredient fibers Dyneema® SK75 and SK78 is 35 cN/dtex)

Example 1

Tensile testing (to measure maximum breaking load, MBL measured in kgf (kilogram force)) was performed on dry samples using a break load tester 13000 kN Horizontal bench fa. Staalkabel Mennens (Dongen, The Netherlands) testing machine, at a temperature of about 16° C., a speed of 20 mm/min. Maximum clamp length was 3×1050 mm=3.15 m and the pin diameter was 220 mm. The chains were tested using D-shackles, the ratio between the diameter of the shackle and the thickness of the tested article connected to them was 5. The D-shackles are arranged in a parallel configuration for the rope.

The maximum breaking load (MBL), i.e. the force necessary to completely rupture a dry sample of a chain of a Dyneema® SK78 yarn of 1760 dtex (=1760 g for 10000 m) commercially available from DSM Dyneema B.V. The Netherlands was measured. The yarn made with Dyneema® SK78 had 35 cN/dtex initial specific yarn strength. The results obtained are shown in Table 1.

A 12 strands braided rope having the construction of 12×[7×(15×1760 dtex)] of a Dyneema® SK78 yarn was produced (first 15 yarns with a linear density of 1760 dtex SK78 material were assembled and twisted to a single heavy yarn; subsequently, 7 of those heavy yarns were processed to one cable, and finally 12 of those cables were processed to become the even bigger final rope). The first cables made from the assembled yarns were produced on Roblon TT & Strander machine and afterwards of these, 12 of these cables were braided on the Herzog SG and NG machines to become the final rope. About 15 wt % of a commercially available coating ICO-DYN-10 was then applied on the surface of the rope.

The thickness of the rope τ was 18 mm. The rope weight per meter (gravimetric measured) was 247 gram.

Chain links of 1 m in length (measured from pin to pin) were manufactured by connecting into a single loop the free ends of the rope with a splice. About 20% of the surface of each chain link (core) was then encapsulated in a tubular sleeve (cover). The sleeve was applied at the location through which loads are transmitted between the three chain links. The thickness of the spacer is (2× the thickness) of each sleeve at the interconnection point between two adjacent chain links. The sleeve made of Dyneema® was supplied by Marathon Ltd., UK under the commercial name Triple A Plus™ was 50 mm wide and had 10 mm thickness. The weight of each link was about 1482 g.

A chain was made by interconnecting three chain links as manufactured above. The final chain had an effective thickness Δ=10 mm and f=Δ/τ=10 mm/18 mm=0.55. The MBL of the chain was measured to be 123110 kgf (1207710 N), corresponding to tenacity of 8.14 cN/dTex. The efficiency of the chain was 23%.

Comparative Example 1 (CE1)

The chain used in CE1 had the same as the chain described in Example 1, with the difference that no sleeve was applied to the chain links. Thus, the chain described in CE1 did not have any spacer. The results are shown in Table 1.

The MBL of the chain was measured to be 85430 kgf (838068 N), corresponding to a tenacity of 5.6 cN/dtex. The efficiency of the chain was 16%.

Example 2

Tensile testing (to measure MBL) was performed on dry samples using a break load tester 1000 kN Horizontal bench fa. ASTEA (Sittard, The Netherlands) testing machine, at a temperature of about 16° C., a speed of 20 mm/min. Maximum clamp length was 1.2 m and the pin diameter was 150 mm. The chains were tested using D-shackles, the ratio between the diameter of the shackle and the thickness of the tested article connected to them was 5. The D-shackles are arranged in a parallel configuration for the rope.

The maximum breaking load (MBL), i.e. the force necessary to completely rupture a dry sample of a chain of a Dyneema® SK75 yarn of 1760 dtex (=1760 g for 10000 m), commercially available from DSM Dyneema B.V. The Netherlands were determined. The yarn made with Dyneema® SK75 had 35 cN/dtex initial specific yarn strength. The results obtained are shown in Table 1.

A 3 strand layed rope having the construction 3×[8×(10× 1760 dtex)] and containing a Dyneema® SK75 yarn was produced. Particularly, [8 multifilament yarns×(10×1760 dtex filaments twisted together)] were produced on a Roblon TT & Strander machine and of these afterwards 3 strands were twisted on Herzog SG and NG machines. About 15 wt % of a commercially available coating ICO-DYN-10 was then applied on the surface of the rope. The thickness of the rope τ was 6 mm. The rope weight per meter (gravimetric measured) was 43 gram. The rope based link length was 300 mm.

Chain links of 300 mm in length (measured from pin to pin) were manufactured by connecting into a 6 loops system the free ends of the rope with a splice. The weight of each link was 155 g.

A 6 layer webbing chain link was constructed from a narrow weave strip comprising Dyneema® SK75, with a width of 25 mm and a length of 400 mm. The strip is commercially available from Guth & Wolf (silver grey 1" weave) with a nominal breaking strength of 5 tons (49 kN) and a leg weight of 44 g/m. A total of 6 convolutions were performed with approximately 2 m of the strip. The so formed 180 degree twisted link link had approximate circumferences of 400 mm (inner) and 465 mm (outer) and the thickness of the 6 layers links was 8 mm. The 2 ends of the sling overlapped by approximately 50 mm and are stitched together through the thickness of the 180 degrees twisted link over a length of 40 mm with an MW stitching with Xtreme-tech 20/40 (Amann, Germany) sewing threat. The chain link had a weight of about 500 g corresponding to the 6 convolutions of strip material. On the inside circumference of the chain link, 9 layers of a 50 mm wide webbing strip, knitted from Dyneema® fiber SK75 (1760 dtex) from Marathon Ltd, UK was connected to the chain link by the same way of stitching. The total weight of this combined conic spacer, formed from a 50 mm wide strip and a 25 mm wide strip with improved fit into the rope links of the synthetic chain, reached about 1 kg yarn.

A three chain link chain was then made by interconnecting in the following sequence: one chain link made of the layed rope with one 6 layer webbing chain link with the 9 layer webbing strip chain link and with a second chain link made of the layed rope again. The weight of the 3 links chain was 1.615 kg. The total length of this three link chain achieved 1 meter corresponding to a titer of 1615000 tex. Without the webbing based special interface, the pure rope titer was 506880 tex.

The MBL of the chain was measured to be 62330 kgf (610834 N), providing a tenacity of 3.78 N/tex. However, the pure rope efficiency, based on the pure rope titer, achieved 610834 N/506880 tex=12.05 cN/dtex. The efficiency of the rope chain, corrected by the 6+9 webbing based spacer achieved thus up to 33%.

The final chain had an effective thickness $\Delta=13$ mm and $f=\Delta/\tau=13$ mm/6 mm=2.16.

Comparative Example 2 (CE2)

The chain used in CE1 had the same as the chain described in Example 2, with the difference that the chain described in CE1 did not comprise an interface. The results are shown in Table 1.

The MBL of the chain was measured to be 27200 kgf (266560 N), corresponding to a tenacity of 5.25 cN/dtex only. The efficiency of the rope based chain, now without spacer interface, achieved 15% only.

Example 3

A 8 layer webbing chain link was constructed from a narrow weave strip comprising Dyneema® SK75, with a width of 25 mm. The strip is commercially available from Guth & Wolf (silver grey 1" weave) with a nominal breaking strength of 5 tons (49 kN) and a leg weight of 44 g/m. A length of the strip was tightly convoluted to form a 0-shape link (loop) bearing a 180 degree twist in each convolution of the strip. A total of 8 convolutions were performed with approximately 2.5 m of the strip. The so formed 180 degree twisted link had approximate circumferences of 110 mm (inner) and 134 mm (outer) and the thickness of the 8 layers links was 12 mm. The 2 ends of the sling overlapped by approximately 110 mm and are stitched together through the thickness of the 180 degrees twisted link over a length of 110 mm with an MW stitching with Xtreme-tech 20/40 (Amann, Germany) sewing threat. The twisted chain link had a weight of about 110 g.

A chain was made by interconnecting three chain links as manufactured above. The weight of the 3 links chain was 330 g.

An interface was made by overlapping two webbings in angle of about 90°, each webbing having a width of 50 mm and a length of 150 mm, and then stitching the two crossed webbings with a x-box pattern with Xtreme-tech 20/40 (Amann, Germany) sewing threat. The webbing was commercially available from Guth & Wolf (blue 2" weave) with a nominal breaking strength of 8 tons (80 kN) and a leg weight of 88 g/m. The 2 ends of the crossed webbing was stitched together over the whole width of 25 mm with Xtreme-tech 20/40 (Amann, Germany) sewing threat. These two ends was tied together by a Ty-rap so that the interface cannot slip out of the chain. These Ty-raps were passed through the sewn eye. Thus the ty-raps functioned as a stabilizer, keeping the spacers at the desired location, preventing them to be pressed out of the interface region during loading.

The crossed webbings were attached inside the loop of the 8 layer webbing chain link as made above, at the location where each two adjacent chain links interconnect, by tying the ends of the stitched ends with two ty-raps.

The MBL of the chain was measured to be 29279 kgf (286934.2 N). The weight of the chain was measured 500 g/m resp. 500000 tex. This corresponds to a tenacity of 5.73 cN/dtex. This corresponds to a yarn efficiency of about 16%.

The final chain had an effective thickness $\Delta=12$ mm and $f=\Delta/\tau=12$ mm/8 mm=1.5.

Comparative Example 3 (CE3)

The chain used in CE3 was manufactured in the same way as the chain described in Example 3, with the difference that the chain described in CE3 did not comprise an interface. The MBL of the chain was measured to be 22759 kgf (223038.2 N), corresponding to tenacity of 4.46 cN/dtex. The efficiency of the chain without spacer only reached 9%, which is significant lower than in Example 3.

TABLE 1

| Chain | Chain MBL (kgf) | Chain Tenacity (cN/dTex) | Chain Efficiency (%) |
|---|---|---|---|
| Ex. 1 | 123110 | 8.14 | 23% |
| CE1 | 85430 | 5.6 | 16% |
| Ex. 2 | 62330 | 12.05 | 33% |
| CE2 | 27200 | 5.25 | 15% |
| Ex. 3 | 29279 | 5.73 | 16% |
| CE3 | 22759 | 4.46 | 9% |

The invention claimed is:

1. A chain comprising a plurality of chain links comprising polymeric fibers, wherein the chain comprises at least one spacer which includes:
   (i) a thickness $\Delta$ between adjacent chain links at a contact location through which loads are directly transmitted between the adjacent chain links, and
   (ii) a ratio $\Delta/\tau=f$, wherein $\tau$ is a thickness of any of the chain links at the location through which loads are transmitted between the adjacent chain links and f is in a range between 0.10 and 2.50, and wherein the spacer is a portion of material that is discontinuous from the chain links which maintains distance between the adjacent chain links, and wherein the spacer has a shape such that the spacer prevents direct load bearing contact between the adjacent chain links.

2. The chain according to claim 1, wherein f is between 0.50 and 2.50.

3. The chain according to claim 1, wherein the chain links comprise laid, twisted, braided or woven polymeric fiber.

4. The chain according to claim 1, wherein each contact location through which loads are directly transmitted between the chain links comprises a spacer.

5. The chain according to claim 1, wherein the polymeric fibers comprise polyolefin fibers.

6. The chain according to claim 1, wherein the polymeric fibers comprise ultrahigh molecular weight polyethylene fibers.

7. The chain according to claim 1, wherein the spacer comprises a material selected from a group comprising metals, wood, polymers, textiles and fibers.

8. The chain according to claim 1, wherein the spacer comprises fibers selected from the group consisting of polymeric fibers and metallic fibers.

9. The chain according to claim 1, wherein the spacer comprises polyolefin fibers.

10. The chain according to claim 1, wherein at least one chain link comprises a sleeve, and wherein the spacer is a portion of the sleeve at the contact location through which loads are directly transmitted between adjacent chain links.

11. The chain according to claim 10, wherein the sleeve covers up to 90% of a surface of the at least one chain link.

12. The chain according to claim 9, wherein the spacer comprises ultrahigh molecular weight polyethylene fibers.

13. The chain according to claim 10, wherein the sleeve covers up to 80% of a the surface of the at least one chain link.

14. The chain according to claim 10, wherein the sleeve covers up to 70% of a the surface of the at least one chain link.

15. The chain according to claim 1, wherein the chain is for storing, securing, lashing and tying down for handling and transporting cargo, in lifting and hoisting, logging, hauling and rigging, propulsion and driving, mooring, cargo-hold of an aircraft or naval ship.

16. A method to increase efficiency of a load-bearing component comprising a chain having a plurality of chain links, wherein the method comprises introducing a spacer formed of a portion of material that is discontinuous from the chain links at a contact location through which loads are directly transmitted between the chain links, the spacer having a shape to prevent direct load bearing contact between the adjacent chain links and having a thickness $\Delta$ and a ratio $\Delta/\tau=f$, wherein $\tau$ is a thickness of any of the chain links at the contact location through which loads are directly transmitted between the chain links and f is in a range between 0.10 and 2.50.

* * * * *